US012617404B2

(12) United States Patent
Rahman et al.

(10) Patent No.: US 12,617,404 B2
(45) Date of Patent: May 5, 2026

(54) VEHICLE MANEUVERING

(71) Applicant: Ford Global Technologies, LLC, Dearborn, MI (US)

(72) Inventors: Yousaf Rahman, Ypsilanti, MI (US); Mrdjan J. Jankovic, Birmingham, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 18/194,118

(22) Filed: Mar. 31, 2023

(65) Prior Publication Data

US 2024/0326815 A1      Oct. 3, 2024

(51) Int. Cl.
*B60W 30/18*          (2012.01)
*B60W 30/14*          (2006.01)

(52) U.S. Cl.
CPC .... *B60W 30/18163* (2013.01); *B60W 30/143* (2013.01); *B60W 2520/00* (2013.01); *B60W 2554/404* (2020.02)

(58) Field of Classification Search
CPC ......... B60W 30/18163; B60W 30/143; B60W 2520/00; B60W 2554/404; B60W 30/18; B60W 30/0956; G05D 1/00; G08G 1/00; G01C 21/00
See application file for complete search history.

(56) References Cited

U.S. PATENT DOCUMENTS

| | | | | |
|---|---|---|---|---|
| 9,645,577 | B1 * | 5/2017 | Frazzoli | ............. B60W 60/0011 |
| 10,800,416 | B2 * | 10/2020 | Aine | ...................... G08G 1/166 |
| 10,953,873 | B2 | 3/2021 | Buerkle et al. | |
| 11,327,496 | B2 | 5/2022 | Jankovic et al. | |
| 11,400,934 | B2 * | 8/2022 | Jalali | ................ G08G 1/096725 |
| 11,840,234 | B1 * | 12/2023 | Ward | .................... B60W 40/04 |
| 12,024,204 | B2 * | 7/2024 | Fedorov | .......... B60W 30/18163 |
| 12,472,979 | B2 * | 11/2025 | You | ................... B60W 60/0015 |

(Continued)

FOREIGN PATENT DOCUMENTS

| | | |
|---|---|---|
| CN | 111275986 B | 6/2020 |
| CN | 112693465 A | 4/2021 |

OTHER PUBLICATIONS

Lyu, Y., et al., "Probabilistic Safety-Assured Adaptive Merging Control for Autonomous Vehicles," arXiv:2104.14159v1 [cs.RO] Apr. 29, 2021, 7 pages.

(Continued)

*Primary Examiner* — Angelina M Shudy

(74) *Attorney, Agent, or Firm* — Frank A. Mackenzie; Brooks Kushman P.C.

(57)          ABSTRACT

A computer includes a processor and a memory, and the memory stores instructions executable by the processor to receive a command for a host vehicle to perform a maneuver, detect a target vehicle, minimize a cost function, determine a host control input for the host vehicle based on the minimization of the cost function, and actuate the host vehicle to perform the maneuver according to the host control input. The cost function includes a host cost and a target cost. The host cost is a cost associated with a host kinematic state of the host vehicle, and the target cost is a cost associated with a target kinematic state of the target vehicle.

20 Claims, 5 Drawing Sheets

(56) References Cited

U.S. PATENT DOCUMENTS

| 2004/0068359 | A1* | 4/2004 | Neiss | G05B 13/048 |
| | | | | 180/170 |
| 2009/0228185 | A1* | 9/2009 | Laiou | B60W 30/16 |
| | | | | 701/96 |
| 2013/0218365 | A1* | 8/2013 | Caveney | G05D 1/0295 |
| | | | | 701/1 |
| 2014/0067206 | A1* | 3/2014 | Pflug | B60T 7/22 |
| | | | | 701/41 |
| 2014/0195093 | A1* | 7/2014 | Litkouhi | B60W 30/18163 |
| | | | | 701/23 |
| 2015/0284010 | A1* | 10/2015 | Beardsley | G08G 5/57 |
| | | | | 701/1 |
| 2016/0275797 | A1* | 9/2016 | Lefevre | G08G 1/166 |
| 2017/0227966 | A1* | 8/2017 | Monzen | B62D 15/0255 |
| 2018/0001892 | A1* | 1/2018 | Kim | B60W 40/04 |
| 2018/0009445 | A1* | 1/2018 | Nishi | G06N 7/01 |
| 2018/0011488 | A1* | 1/2018 | Nishi | G05D 1/0221 |
| 2018/0046192 | A1* | 2/2018 | Keller | B60W 30/09 |
| 2018/0074505 | A1* | 3/2018 | Lv | B60W 60/00272 |
| 2018/0154850 | A1* | 6/2018 | Yates | G08G 1/166 |
| 2018/0341269 | A1* | 11/2018 | Lv | G01C 21/3407 |
| 2018/0354518 | A1* | 12/2018 | Inou | B60W 60/00272 |
| 2019/0056743 | A1* | 2/2019 | Alesiani | G05D 1/0217 |
| 2019/0106014 | A1* | 4/2019 | Zhao | G01C 21/3469 |
| 2019/0113927 | A1* | 4/2019 | England | G06F 16/285 |
| 2019/0171226 | A1* | 6/2019 | Kim | G08G 1/22 |
| 2020/0172093 | A1* | 6/2020 | Kum | G06N 3/047 |
| 2020/0231149 | A1* | 7/2020 | Eggert | G08G 1/166 |
| 2020/0290619 | A1* | 9/2020 | Mehdi | B60W 40/04 |
| 2020/0298853 | A1* | 9/2020 | Bast | G08G 1/166 |
| 2020/0307589 | A1* | 10/2020 | Li | B60W 60/0023 |
| 2020/0387167 | A1* | 12/2020 | Sujan | B60W 30/143 |
| 2021/0009128 | A1* | 1/2021 | Jokela | B60W 20/12 |
| 2021/0046925 | A1* | 2/2021 | Bonkoski | B60W 30/09 |
| 2021/0061282 | A1* | 3/2021 | Jafari Tafti | G05D 1/0088 |
| 2021/0064060 | A1* | 3/2021 | Park | G05D 1/0295 |
| 2021/0078603 | A1* | 3/2021 | Nakhaei Sarvedani | |
| | | | | B60W 30/18163 |
| 2021/0109533 | A1* | 4/2021 | Nakadai | G05D 1/0276 |
| 2021/0110484 | A1* | 4/2021 | Shalev-Shwartz | G05D 1/0088 |
| 2021/0116935 | A1* | 4/2021 | Kalabic | G08G 1/22 |
| 2021/0123755 | A1* | 4/2021 | Moik | B60W 30/09 |
| 2021/0146922 | A1* | 5/2021 | Fuchs | G08G 1/096791 |
| 2021/0284162 | A1* | 9/2021 | Parks | G05D 1/0212 |
| 2021/0309214 | A1* | 10/2021 | Hashimoto | B60W 30/08 |
| 2021/0331676 | A1* | 10/2021 | Wu | B60W 50/00 |
| 2021/0403044 | A1* | 12/2021 | Wieland | G06F 18/214 |
| 2021/0403050 | A1 | 12/2021 | Gan et al. | |
| 2022/0032960 | A1* | 2/2022 | Wang | G05D 1/0088 |
| 2022/0063610 | A1* | 3/2022 | Hafner | B60W 10/18 |
| 2022/0080968 | A1* | 3/2022 | Zhu | G06N 20/10 |
| 2022/0089164 | A1* | 3/2022 | Wang | B60W 30/18163 |
| 2022/0092987 | A1* | 3/2022 | Oboril | B60W 30/0956 |
| 2022/0097732 | A1* | 3/2022 | Cunningham | B60W 60/0011 |
| 2022/0118972 | A1 | 4/2022 | Kim | |
| 2022/0126822 | A1* | 4/2022 | Wang | B60W 50/0097 |
| 2022/0177001 | A1* | 6/2022 | Kulkarni | B60W 60/0011 |
| 2022/0219695 | A1* | 7/2022 | Satti | G06N 3/006 |
| 2022/0242413 | A1* | 8/2022 | Jing | B60W 10/10 |
| 2022/0281451 | A1* | 9/2022 | Bani Milhim | B60W 30/16 |
| 2023/0099853 | A1* | 3/2023 | Mangas | B60W 60/00274 |
| 2023/0099857 | A1* | 3/2023 | Godet-Bar | H01M 8/188 |
| | | | | 429/499 |
| 2023/0159032 | A1* | 5/2023 | Rahman | B60W 30/16 |
| | | | | 701/25 |
| 2023/0159056 | A1* | 5/2023 | Cheng | B60W 30/0956 |
| | | | | 701/301 |
| 2023/0174084 | A1* | 6/2023 | Olson | G06F 16/9024 |
| | | | | 701/23 |
| 2023/0192074 | A1* | 6/2023 | Abad | B60W 60/0053 |
| | | | | 701/26 |
| 2023/0286536 | A1* | 9/2023 | Belman | G01C 21/3415 |
| 2023/0316920 | A1* | 10/2023 | Di Cairano | G08G 1/083 |
| | | | | 701/26 |
| 2023/0343221 | A1* | 10/2023 | Ward | G08G 1/22 |
| 2023/0386343 | A1* | 11/2023 | Borhan | G08G 1/22 |
| 2023/0415743 | A1* | 12/2023 | Ward | B60W 60/00276 |
| 2024/0001926 | A1* | 1/2024 | Singh | B60W 30/16 |
| 2024/0001961 | A1* | 1/2024 | Myung | B60W 60/0015 |
| 2024/0116511 | A1* | 4/2024 | Gupta | G08G 1/167 |
| 2024/0157937 | A1* | 5/2024 | Gudapati | G08G 1/052 |
| 2024/0157973 | A1* | 5/2024 | Pini | B60W 50/0097 |
| 2024/0174227 | A1* | 5/2024 | Nimura | G08G 1/167 |
| 2024/0177601 | A1* | 5/2024 | Cain, Jr. | G08G 1/096805 |
| 2024/0272637 | A1* | 8/2024 | Liu | G01C 21/26 |
| 2024/0300489 | A1* | 9/2024 | Shen | B60W 60/00276 |
| 2024/0420344 | A1* | 12/2024 | Hu | G06V 10/82 |
| 2024/0425067 | A1* | 12/2024 | Takeuchi | G05B 13/02 |
| 2025/0002016 | A1* | 1/2025 | Emoto | B60W 30/16 |
| 2025/0074404 | A1* | 3/2025 | Shalev-Shwartz | B60W 50/12 |
| 2025/0074469 | A1* | 3/2025 | Yeom | B60W 30/09 |
| 2025/0077741 | A1* | 3/2025 | Nogales Iturri | B60W 60/001 |
| 2025/0111784 | A1* | 4/2025 | Chalaki | B60W 60/00276 |
| 2025/0187598 | A1* | 6/2025 | Clarke | G06V 20/58 |
| 2025/0222961 | A1* | 7/2025 | Hao | B60W 60/0027 |
| 2025/0224743 | A1* | 7/2025 | Kumagai | G05D 1/249 |
| 2025/0234403 | A1* | 7/2025 | Vemuri | H04W 76/15 |
| 2025/0333062 | A1* | 10/2025 | Sefati | B60W 30/18163 |
| 2025/0363329 | A1* | 11/2025 | Xue | G06N 3/08 |

OTHER PUBLICATIONS

Santillo, M., et al., "Collision Free Navigation with Interacting, Non-Communicating Obstacles," arXiv:2008.12092v1 [eess.SY] Aug. 27, 2020, 7 pages.

* cited by examiner

VEHICLE MANEUVERING

BACKGROUND

A vehicle can be equipped with electronic and electro-mechanical components, e.g., computing devices, networks, sensors, and controllers. A vehicle computer can acquire data regarding the vehicle's environment and can operate the vehicle or at least some components thereof based on the acquired data. Vehicle sensors can provide data concerning routes to be traveled and objects to be maneuvered around in the vehicle's environment. Operation of the vehicle can include acquiring accurate and timely data regarding objects in a vehicle's environment while the vehicle is being operated.

DETAILED DESCRIPTION

Figure 1:
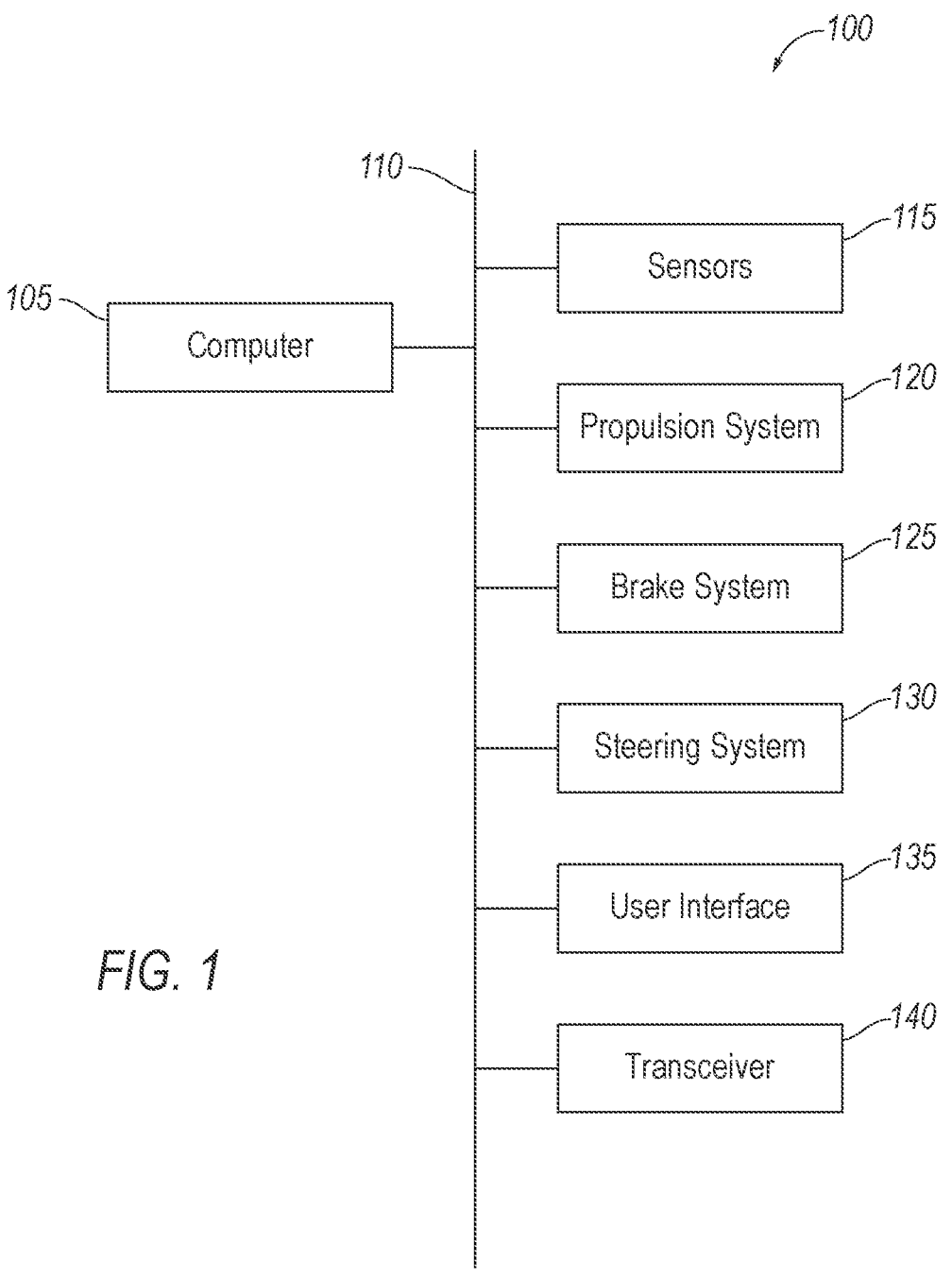
FIG. 1 is a block diagram of an example vehicle.

The disclosure describes techniques for a host vehicle to perform a maneuver that involves coordinating with one or more target vehicles. Examples of maneuvers include merging or changing into a lane in which the target vehicles are traveling. The techniques may be used to select whether to enter the lane in front of or behind a target vehicle and control the speed of the host vehicle accordingly. A computer of the host vehicle is programmed to receive a command for the host vehicle to perform a maneuver, detect a target vehicle, minimize a cost function, determine a host control input for the host vehicle based on the minimization of the cost function, and actuate the host vehicle to perform the maneuver according to the host control input. For example, the host control input may be an acceleration or deceleration of the host vehicle. The cost function includes a host cost and a target cost. The host cost is a cost associated with a host kinematic state of the host vehicle, and the target cost is a cost associated with a target kinematic state of the target vehicle. The cost function may include greater costs associated with greater acceleration or deceleration of the host vehicle and target vehicle, thereby encouraging minimization of the acceleration or deceleration of the vehicles, as well as other factors.

The computer does not actuate the target vehicle, only the host vehicle, and may not even be in communication with the target vehicle. But by including the target cost in the cost function along with the host cost, more efficient coordination of the maneuver between the host vehicle and the target vehicle may be achieved. For example, the techniques herein may be able to mitigate "soft gridlock," a situation in which the host vehicle and target vehicle both attempt to give the other one the right of way. The inventors have run simulations of a scenario in which the host vehicle merges into a lane in which the target vehicle is traveling, with the acceleration of the host vehicle controlled according to the techniques described herein, i.e., with a cost function including the host cost and the target cost, as well as with the acceleration of the host vehicle controlled according to a similar cost function without the target cost. When the cost function does not include the target cost, the simulation found that a range of initial positions of the target vehicle that result in soft gridlock is approximately 15 meters long. When the cost function includes the target cost, the simulation found that the range of initial positions of the target vehicle that result in soft gridlock is only 2.75 centimeters.

A computer includes a processor and a memory, and the memory stores instructions executable by the processor to receive a command for a host vehicle to perform a maneuver, detect a target vehicle, minimize a cost function, determine a host control input for the host vehicle based on the minimization of the cost function, and actuate the host vehicle to perform the maneuver according to the host control input. The cost function includes a host cost and a target cost. The host cost is a cost associated with a host kinematic state of the host vehicle, and the target cost is a cost associated with a target kinematic state of the target vehicle.

In an example, the host control input may include a host acceleration of the host vehicle.

In an example, the instructions may further include instructions to determine a target control input for the target vehicle based on the minimization of the cost function. In a further example, the instructions may not include instructions to actuate the target vehicle.

In another further example, the instructions may further include instructions to execute a feedback loop, the feedback loop including the minimization of the cost function. In a yet further example, the feedback loop may include a determination of a difference between the target control input and a target observed behavior of the target vehicle. In a still yet further example, the target control input may include a target predicted acceleration of the target vehicle, and the target observed behavior may include a target observed acceleration of the target vehicle.

In an example, the maneuver may be the host vehicle entering a lane. In a further example, the target vehicle may be in the lane.

In another further example, the instructions may further include instructions to select between the host vehicle entering the lane in front of the target vehicle and the host vehicle entering the lane behind the target vehicle by minimizing the cost function.

In an example, the cost function may include a summation of the host cost through a completion of the maneuver and a summation of the target cost through the completion of the maneuver.

In an example, the host cost may include a host acceleration cost associated with an acceleration of the host vehicle. In a further example, the target cost may include a target acceleration cost associated with an acceleration of the target vehicle.

In an example, the host cost may include a speed cost associated with a speed of the host vehicle.

In an example, the host cost may include a jerk cost associated with a change in acceleration of the host vehicle.

In an example, the instructions to minimize the cost function may include instructions to minimize the cost function subject to a constraint to prevent intersecting a virtual barrier of the target vehicle.

In an example, the instructions to minimize the cost function may include instructions to perform mixed-integer quadratic programming.

In an example, the target vehicle may be a first target vehicle, the target cost may be a first target cost, the target kinematic state may be a first target kinematic state, the instructions may include instructions to detect a second target vehicle, the cost function may include a second target cost, and the second target cost may be associated with a second target kinematic state of the second target vehicle. In a further example, the maneuver may be the host vehicle entering a lane, the first target vehicle and the second target vehicle may be in the lane, the first target vehicle may be ahead of the second target vehicle, and the instructions may further include instructions to select among (1) the host vehicle entering the lane in front of the first target vehicle, (2) the host vehicle entering the lane behind the first target vehicle and ahead of the second target vehicle, and (3) the host vehicle entering the lane behind the second target vehicle, by minimizing the cost function.

A method includes receiving a command for a host vehicle to perform a maneuver, detecting a target vehicle, minimizing a cost function, determining a host control input for the host vehicle based on the minimization of the cost function, and actuating the host vehicle to perform the maneuver according to the host control input. The cost function includes a host cost and a target cost. The host cost is a cost associated with a host kinematic state of the host vehicle, and the target cost is a cost associated with a target kinematic state of the target vehicle.

With reference to the Figures, wherein like numerals indicate like parts throughout the several views, a computer 105 includes a processor and a memory, and the memory stores instructions executable by the processor to receive a command for a host vehicle 100 to perform a maneuver, detect a target vehicle 200, minimize a cost function, determine a host control input for the host vehicle 100 based on the minimization of the cost function, and actuate the host vehicle 100 to perform the maneuver according to the host control input. The cost function includes a host cost and a target cost. The host cost is a cost associated with a host kinematic state of the host vehicle 100, and the target cost is a cost associated with a target kinematic state of the target vehicle 200.

With reference to FIG. 1, the host vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to sensors 115, a propulsion system 120, a brake system 125, a steering system 130, a user interface 135, a transceiver 140, and other components via the communications network 110.

The sensors 115 may provide data about operation of the vehicle, for example, wheel speed, wheel orientation, and engine and transmission data (e.g., temperature, fuel consumption, etc.). The sensors 115 may detect the location and/or orientation of the host vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the host vehicle 100, such as the target vehicles 200, road lane markings, traffic lights and/or signs, pedestrians, etc. For example, the sensors 115 may include radar sensors, ultrasonic sensors, scanning laser range finders, light detection and ranging (lidar) devices, and image processing sensors such as cameras.

The propulsion system 120 of the vehicle generates energy and translates the energy into motion of the host vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the host vehicle 100 to thereby slow and/or stop the host vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The user interface 135 presents information to and receives information from an operator of the host vehicle 100. The user interface 135 may be located, e.g., on an instrument panel in a passenger cabin of the host vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

The transceiver 140 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 140 may be adapted to communicate with a remote server, that is, a server distinct and spaced from the host vehicle 100. The remote server may be located outside the host vehicle 100. For example, the remote server may be associated with one of the target vehicles 200 (e.g., V2V communications), an infrastructure component (e.g., V2I communications), an emergency responder, a mobile device associated with the owner of the host vehicle 100, etc. The transceiver 140 may be one device or may include a separate transmitter and receiver.

Figure 2:
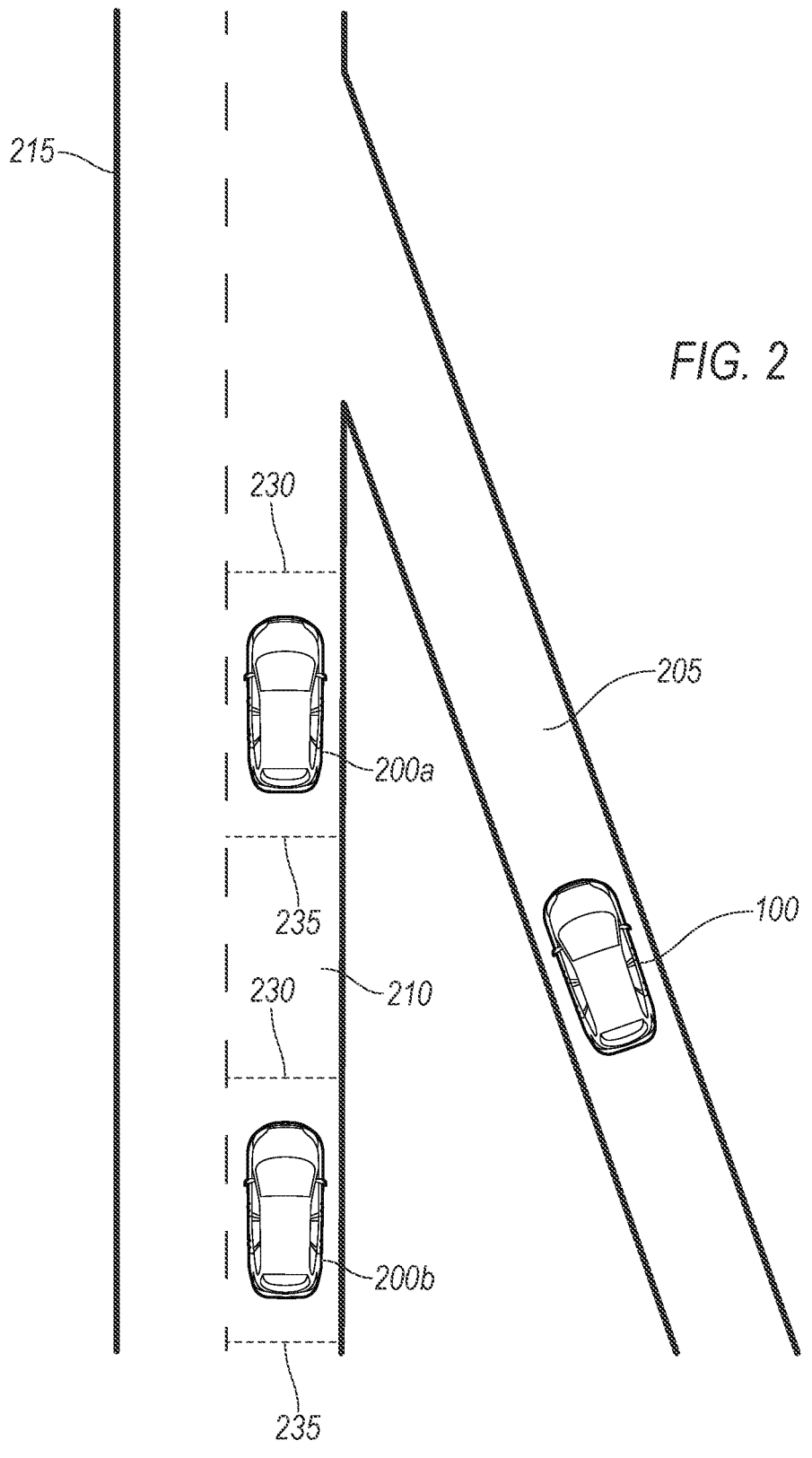
FIG. 2 is a diagram of the vehicle merging onto a limited-access road.
Figure 3:
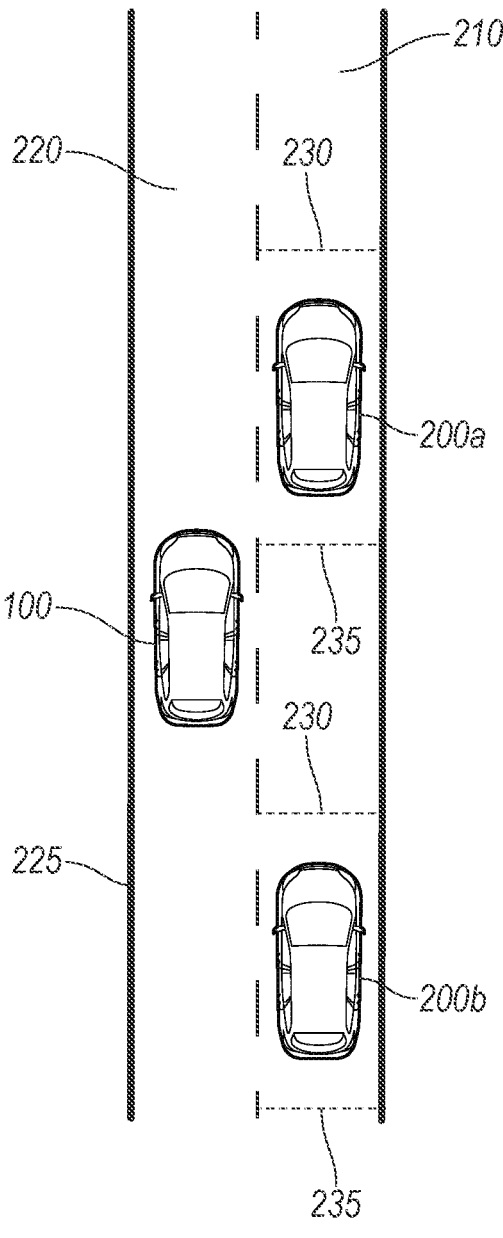
FIG. 3 is a diagram of the vehicle changing lanes.

With reference to FIGS. 2 and 3, the computer 105 is programmed to receive a command for the host vehicle 100 to perform a maneuver. For example, the operator may provide an input via the user interface 135 instructing the computer 105 to perform the maneuver autonomously or semi-autonomously. For another example, the computer 105 may determine to perform the maneuver by executing an autonomous-operation algorithm. The maneuver may involve turn-taking between the host vehicle 100 and one or more of the target vehicles 200. For example, the maneuver may be for the host vehicle 100 to enter a target lane 210 in which the target vehicles 200 are traveling, as shown in FIGS. 2 and 3.

With reference to FIG. 2, the maneuver may be for the host vehicle 100 to enter the target lane 210, e.g., to merge from an onramp 205 into the target lane 210 of a limited-access road 215. One or more target vehicles 200 may be in the target lane 210, e.g., a first target vehicle 200a ahead of a second target vehicle 200b. To complete the maneuver, the vehicle will do one of the following: (1) merge into the target lane 210 in front of the target vehicle(s) 200, (2) merge into the target lane 210 behind the target vehicle(s) 200, or (3) if applicable, merge into the target lane 210 in a gap between consecutive target vehicles 200, e.g., behind the first target vehicle 200a and in front of the second target vehicle 200b.

With reference to FIG. 3, the maneuver may be for the host vehicle 100 to enter the target lane 210, e.g., to change from an originating lane 220 to a target lane 210 of a multiple-lane road 225. One or more target vehicles 200 may be in the target lane 210, e.g., the first target vehicle 200a ahead of the second target vehicle 200b. To complete the maneuver, the vehicle will do one of the following: (1) change into the target lane 210 in front of the target vehicle(s) 200, (2) change into the target lane 210 behind the target vehicle(s) 200, or (3) if applicable, change into the target lane 210 in a gap between consecutive target vehicles 200, e.g., behind the first target vehicle 200a and in front of the second target vehicle 200b.

The computer 105 is programmed to detect the target vehicles 200, e.g., based on data from the sensors 115. For example, the computer 105 may receive data from radar, ultrasonic sensors, and/or lidar indicating objects in the environment, and the computer 105 may classify the objects as target vehicles 200 based on speed and size, e.g., length. Alternatively or additionally, the computer 105 may receive data from a camera, and the computer 105 may classify the target vehicles 200 as target vehicles 200 using conventional object-recognition techniques, e.g., a convolutional neural network programmed to accept images as input and output an identified type of object.

The computer 105 is programmed to identify alternative final ordinal positions of the host vehicle 100 relative to the target vehicles 200, e.g., at least two final ordinal positions. A final ordinal position is a position of the host vehicle 100 at the completion of the maneuver relative to the target vehicles 200 within an ordering of the host vehicle 100 and the target vehicles 200. The final ordinal position is "final" in that it is a position of the host vehicle 100 at the completion of the maneuver. The final ordinal position is "ordinal" in that it is a position within an ordering of the host vehicle 100 and the target vehicles 200, i.e., a position indicating whether the host vehicle 100 is ahead or behind one of the target vehicles 200 but not a distance between the host vehicle 100 and the target vehicle 200. For example, if one target vehicle 200 is in the target lane 210, the final ordinal positions are in front of the target vehicle 200 and behind the target vehicle 200. For another example, if two target vehicles 200 are in the target lane 210 as shown in FIGS. 2 and 3, the final ordinal positions are (1) in front of the first target vehicle 200a, (2) behind the first target vehicle 200a and ahead of the second target vehicle 200b, and (3) behind the second target vehicle 200b.

The computer 105 is programmed to minimize a cost function, as will be described below, subject to a plurality of constraints. A first constraint is selecting exactly one final ordinal position. The selection of the final ordinal position may be represented by a set of binary variables b. Each binary variable in the set may represent one of the final ordinal positions and may be zero when that final ordinal position is selected and one otherwise. The constraint may thus be that the sum of the binary variables equals one less than the number of binary variables, i.e., one less than the number of alternative final ordinal positions. For example, in a situation with two target vehicles 200, there are three alternative final ordinal positions, as described above, and the first constraint may be as follows:

$$b_{1+} + b_{1-2} + b_{2-} = 2$$

in which the subscript 1+ indicates the final ordinal position in front of the first target vehicle 200a, the subscript 1-2 indicates the final ordinal position between the first target vehicle 200a and the second target vehicle 200b, and the subscript 2-indicates the final ordinal position behind the second target vehicle 200b. Continuing this example, if the final ordinal position is between the first target vehicle 200a and the second target vehicle 200b, then the binary variable $b_{1-2}$ equals zero, and the binary variables $b_{1+}$ and $b_{2-}$ equal one, thus satisfying the first constraint.

The computer 105 is programmed to determine a host kinematic state of the host vehicle 100 and target kinematic states of the target vehicles 200. For the purposes of this disclosure, a "kinematic state" is defined as a mathematical description of the position and/or motion of an entity. The kinematic states can include some combination of a position, a heading, a velocity vector, a scalar speed, and/or a yaw rate. For example, the kinematic states may include position, heading, and scalar speed. The computer 105 may determine the host kinematic state based on data from the sensors 115, e.g., from a GPS sensor, wheel speed sensors, IMUs, etc. The computer 105 may determine the target kinematic states based on data from the sensors 115, e.g., positions and velocities of the target vehicles 200 over time from radar, ultrasonics sensors, and/or lidar.

The techniques below determine a host control input and one or more target control inputs as a result of minimizing the cost function. For the purposes of this disclosure, a "control input" is defined as one or more values that control operation of a component of a vehicle. For example, the components of the host vehicle 100 may include the propulsion system 120 and the brake system 125, and the host control input may include a host acceleration of the host vehicle 100. Actuating the propulsion system 120 may include, when the host acceleration is positive, setting the throttle to the host acceleration. Actuating the brake system 125 may include, when the host acceleration is negative, engaging the brake system 125 with a brake force resulting in a negative acceleration equal to the host acceleration. Similarly, the target control inputs may include respective target accelerations of the respective target vehicles 200. The control inputs may further include, e.g., speed of the respective vehicle, steering angle, etc. As described below, the host control input is used for actuating the host vehicle 100, but the target control inputs are not used for actuating the target vehicles 200.

A second set of constraints may be that values of the control inputs are within predetermined ranges. The predetermined ranges may be chosen based on the physical capabilities of the host vehicle 100, e.g., the propulsion system 120, the brake system 125, and/or the steering system 130, as well as on the comfort of the occupants of the host vehicle 100. For example, the second set of constraint may include that the host acceleration is within a predetermined acceleration range, the target accelerations are within the predetermined acceleration range, a host jerk of the host vehicle 100 is within a predetermined jerk range, and target jerks of the target vehicles 200 are within the predetermined jerk range. Jerk is a rate of change of acceleration. The upper value of the predetermined acceleration range may be chosen based on the capabilities of the propulsion system 120, the lower value of the predetermined acceleration range may be chosen based on the capabilities of the brake system 125, and the predetermined jerk range may be chosen according to the comfort of the occupants. For example, in the situation with two target vehicles 200, the second set of constraint may include the following formulas:

$$a_{min} \leq a_H(i) \leq a_{max}$$

$$a_{min} \leq a_{T1}(i) \leq a_{max}$$

$$a_{min} \leq a_{T2}(i) \leq a_{max}$$

$$\Delta a_{min} \leq \Delta a_H(i) \leq \Delta a_{max}$$

$$\Delta a_{min} \leq \Delta a_{T1}(i) \leq \Delta a_{max}$$

$$\Delta a_{min} \leq \Delta a_{T2}(i) \leq \Delta a_{max}$$

in which i is an index of time steps.

Because the computer 105 does not actuate the target vehicle 200, the target control input can deviate from a target observed behavior of the target vehicle 200. The target control input is determined along with the host control input by minimizing the cost function as described below. The target observed behavior is the target kinematic state as indicated by the data from the sensors 115, as described above. The computer 105 is programmed to determine a difference between the target control input and the target observed behavior. For example, the target control input may include a target predicted acceleration of the target vehicle 200, the target observed behavior may include a target observed acceleration of the target vehicle 200, and the computer 105 may determine a difference between the target observed acceleration and the target predicted acceleration, as given in the following equation:

$$\hat{w}_T = a_T^{meas} - a_T$$

in which the superscript meas indicates an observed value. In the situation of multiple target vehicles 200, the difference may be determined for each target vehicle 200.

The computer 105 is programmed to determine virtual barriers 230, 235 for the target vehicles 200, e.g., a front virtual barrier 230 for each target vehicle 200 and a rear virtual barrier 235 for each target vehicle 200. The virtual barriers 230, 235 may be chosen to be spaced from the respective target vehicles 200 such that the host vehicle 100 should not approach closer to the target vehicles 200 than the virtual barriers 230, 235 to maintain distance from the target vehicles 200. The virtual barriers 230, 235 may be, e.g., control barrier functions. The virtual barriers 230, 235 may be defined to provide a predetermined minimum distance between the host vehicle 100 and the respective target vehicle 200. The virtual boundary may be defined in reference frame relative to the host vehicle 100 as a difference between a distance from the host vehicle 100 to the target vehicle 200 and the predetermined minimum distance plus possibly a distance headway of the target vehicle 200. The distance headway may be a product of a time headway and a speed of the target vehicle 200. The time headway is an estimated time for the host vehicle 100 to reach the target vehicle 200 in the longitudinal direction, which may be set at a predetermined numerical value based on typical speeds for the maneuver. For example, the front virtual barrier 230 may be given by the following equation:

$$h_f = x_T - d_m - k_v v_{Tf}$$

$$\dot{v}_{Tf} = \omega(v_T - v_{Tf})$$

in which $h_f$ is the front virtual barrier 230, $x_T$ is a longitudinal distance between a reference point on the host vehicle 100 and a reference point on the target vehicle 200, $d_m$ is the predetermined minimum distance, $k_v$ is the time headway, $v_T$ is the speed of the target vehicle 200, $v_{Tf}$ is a filtered speed of the target vehicle 200, and $\omega$ is the reciprocal of the time constant T of the filter, i.e., $\omega = 1/T$. The speed and acceleration of the front virtual barrier 230 may be given by the following equations:

$$\dot{h}_f = v_H - v_T - \omega k_v(v_T - v_{Tf})$$

$$\ddot{h}_f = a_H - (1 + \omega k_v)a_T + \omega^2 k_v(v_T - v_{Tf}) - (1 + \omega k_v)\hat{w}_T$$

in which $v_H$ is the speed of the host vehicle 100 and $a_H$ is the acceleration of the host vehicle 100. The rear virtual barrier 235 may be similarly defined in the following equations:

$$h_f = -x_T - d_m - k_v v_{Hf}$$

-continued $$\dot{v}_{Hf} = \omega(v_H - v_{Hf})$$

$$\dot{h}_r = v_T - v_H - \omega k_v(v_H - v_{Hf})$$

$$\ddot{h}_r = a_T - (1 + \omega k_v)a_H + \omega^2 k_v(v_H - v_{Hf}) + \hat{w}_T$$

in which $v_{Hf}$ is a filtered speed of the host vehicle 100.

A third set of constraints on minimizing the cost function may be to prevent intersecting the virtual barriers 230, 235 of the target vehicles 200, i.e., to prevent the host vehicle 100 from moving closer to the target vehicles 200 than the virtual barriers 230, 235. The third set of constraints may include a constraint for each front virtual barrier 230 and each rear virtual barrier 235. For example, in a situation with two target vehicles 200, the third set of constraint may include four constraints. Each constraint may include a term for the acceleration of the virtual barrier 230, 235, a term for the speed of the virtual barrier 230, 235, a term for the position of the virtual barrier 230, 235, a slack variable, and a term for the selection of the final ordinal position; e.g., the constraint may be a sum of the foregoing terms. The acceleration term may depend on the host acceleration, the respective target acceleration, and the difference between the target observed acceleration and the target predicted acceleration. A slack variable is a variable summed to an inequality constraint to turn the constraint into an equality, and whether the constraint is satisfied is indicated by whether the slack variable is positive or negative. The term for the final ordinal position may be a product of the binary variable b implicated by that constraint and a large value M. The large value M is chosen so that constraint is satisfied when the binary variable b is one. Thus, different constraints in the third set are actually constraining depending on the selection of the final ordinal position. For the example with two target vehicles 200, the third set of constraints may be as follows:

$$\ddot{h}_{T1f}(a_H(i), a_{T1}(i), \hat{w}_{T1}(i)) + l_1\dot{h}_{T1f}(i) + l_0 h_{T1f}(i) + s_{T1f}(i) + Mb_{1+} \geq 0$$

$$\ddot{h}_{T1r}(a_H(i), a_{T1}(i), \hat{w}_{T1}(i)) + l_1\dot{h}_{T1r}(i) + l_0 h_{T1r}(i) + s_{T1r}(i) + Mb_{1-2} \geq 0$$

$$\ddot{h}_{T2f}(a_H(i), a_{T2}(i), \hat{w}_{T2}(i)) + l_1\dot{h}_{T2f}(i) + l_0 h_{T2f}(i) + s_{T2f}(i) + Mb_{1-2} \geq 0$$

$$\ddot{h}_{T2r}(a_H(i), a_{T2}(i), \hat{w}_{T2}(i)) + l_1\dot{h}_{T2r}(i) + l_0 h_{T2r}(i) + s_{T2r}(i) + Mb_{2-} \geq 0$$

in which the subscript H indicates the host vehicle 100, the subscript T1 indicates the first target vehicle 200*a*, the subscript T2 indicates the second target vehicle 200*b*, the subscript f indicates the front virtual barrier 230 of the respective target vehicle 200, $\hat{w}$ is the difference between the target control input and the target observed behavior of the respective target vehicle 200, $l_0$ and $l_1$ are decay constants, and s indicates a slack variable.

The computer 105 is programmed to minimize the cost function J. e.g., by determining a selection of the final ordinal position, the host control input, and/or the target control input(s) that minimize the cost function J, subject to the constraints described above. The output of the minimization may include values for the host control input, e.g., the host acceleration; the target control input for each target vehicle 200, e.g., the target accelerations; and the selection of the final ordinal position of the host vehicle 100. For situations with one target vehicle 200, the selection of the final ordinal position may be one of (1) the host vehicle 100 entering the target lane 210 in front of the target vehicle 200 and (2) the host vehicle 100 entering the target lane 210 behind the target vehicle 200. For situations with two target vehicles 200, the selection of the final ordinal position may be one of (1) the host vehicle 100 entering the target lane 210 in front of the first target vehicle 200*a*, (2) the host vehicle 100 entering the target lane 210 behind the first target vehicle 200*a* and ahead of the second target vehicle 200*b*, and (3) the host vehicle 100 entering the target lane 210 behind the second target vehicle 200*b*. The selection of the final ordinal position may be represented in the cost function J by the binary variables b, as described above. The minimization may be represented by the following formula:

$$\min_{a_H, a_{T1}, a_{T2}, s_{T1f}, s_{T1r}, s_{T2f}, s_{T2r}, b_{1+}, b_{1-2}, b_{2-}} J$$

The cost function J includes the host cost $J_H$ and the target cost $J_T$ for each target vehicle 200. For example, the cost function J may include a sum of the host cost $J_H$ and the target costs $J_T$. e.g., for a situation with two target vehicles 200, a sum of the host cost $J_H$, a first target cost $J_{T1}$, and a second target cost $J_{T2}$. The cost function J may further include a cost associated with the slack variables s. The cost associated with the slack variables may include the slack variables from the third set of constraints, e.g., a sum of the squares of the slack variables, summed over the time steps through the completion of the maneuver, weighted by a slack variable weight. For example, the following equation may give the cost function J for a situation with two target vehicles 200:

$$J = J_H + J_{T1} + J_{T2} + H_s \sum_{i=0}^{N-1} \left( s_{T1f}^2(i) + s_{T1r}^2(i) + s_{T2f}^2(i) + s_{T2r}^2(i) \right)$$

in which $H_s$ is the slack variable weight, i is an index of time steps, and N is a prediction horizon measured in a number of time steps. The time horizon N may be a constant value, i.e., the computer 105 calculates the cost function J for the time horizon N from the current time step i. The time horizon N may be chosen to encompass the likely completion of the maneuver.

The host cost is a cost associated with the host kinematic state of the host vehicle 100. The host cost may include a host acceleration cost associated with an acceleration of the host vehicle 100, a host speed cost associated with a speed of the host vehicle 100, and/or a host jerk cost associated with a jerk of the host vehicle 100. The host cost may include a sum of the host acceleration cost, host speed cost, and/or host jerk cost. The host acceleration cost may be a product of an acceleration weight and an acceleration term, e.g., a square of the host acceleration. The host speed cost may be a product of a speed weight and a speed term, e.g., a square of the speed. The host jerk cost may be a product of a jerk weight and a jerk term, e.g., a square of the jerk. The weights may be chosen to make the terms commensurable for summing. The host cost may be a summation through a completion of the maneuver, e.g., as the values for the acceleration, speed, and jerk of the host vehicle 100 change over the time steps i. For example, the host cost may be given by the following formula:

$$J_H = \sum_{i=1}^{N-1} \left( W_v \|v_H(i) - v_d\|^2 + W_a \|a_H(i)\|^2 + W_{\Delta a} \|\Delta a_H(i)\|^2 \right)$$

in which $W_v$ is the speed weight, $v_d$ is a recommended speed for the maneuver, $W_a$ is the acceleration weight, and $W_{\Delta a}$ is the jerk weight. The recommended speed $v_d$ may be a value stored in memory associated with the maneuver or may be included in the command to perform the maneuver.

The target cost is a cost associated with the target kinematic state of each target vehicle 200. The target cost may include a target acceleration cost associated with an acceleration of the target vehicle 200 and/or a target jerk cost associated with a jerk of the target vehicle 200. The target cost may lack a target speed cost associated with a speed of the target vehicle 200 if the host vehicle 100 is not in communication with the target vehicle 200. Alternatively, the target cost may include a target speed cost if the host vehicle 100 receives a recommended or intended speed from the target vehicle 200, e.g., via the transceiver 140. The target cost may include a sum of the target acceleration cost and the host jerk cost, as well as the target speed cost if present. The target acceleration cost, the target jerk cost, and the target speed cost may be defined in the same manner as the respective terms for the host cost above. The weights may be the same as used for the host cost. The target cost may be a summation through a completion of the maneuver by the host vehicle 100, e.g., as the values for the acceleration, speed, and jerk of the target vehicle 200 change. For example, the target cost may be given by the following formula:

$$J_T = \sum_{i=1}^{N-1} \left( W_a \|a_T(i)\|^2 + W_{\Delta a} \|\Delta a_T(i)\|^2 \right)$$

The computer 105 is programmed to minimize the cost function J subject to the constraints using any suitable optimization algorithm. For example, the computer 105 may perform quadratic programming. Quadratic programming means solving optimization problems formulated as quadratic functions. More specifically, the computer 105 may perform mixed-integer quadratic programming (MIQP), quadratic programming in which some decision variables are discrete and some are not discrete, e.g., are continuous. For this application, the binary variables are discrete, and the control inputs and the slack variables are treated as continuous.

Figure 4:
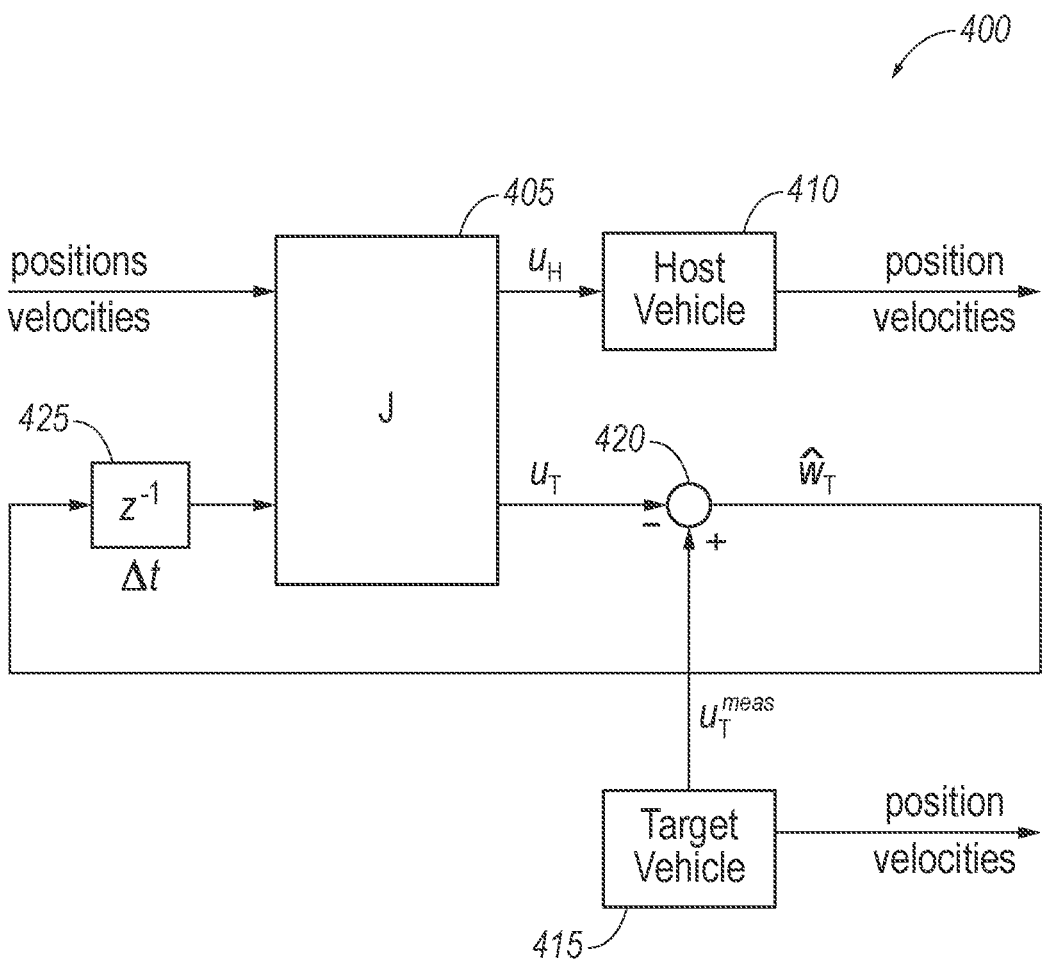
FIG. 4 is a block diagram of an example feedback loop.

FIG. 4 is a block diagram illustrating an example feedback loop 400. The memory of the computer 105 stores executable instructions for executing the feedback loop 400, i.e., performing the steps of the feedback loop 400, and/or programming can be implemented in structures such as mentioned above. The feedback comes from a difference between the target control input, which is a prediction of how the target vehicle 200 will behave, and a target observed behavior of how the target vehicle 200 actually behaves. The feedback loop 400 may execute until the host vehicle 200 completes the maneuver.

In a block 405, the computer 105 determines the host control input $u_H$ and the target control input $u_T$ by minimizing the cost function as described above. The computer 105 receives the host kinematic state and the target kinematic state at a time step i, along with the difference $\hat{w}_T$ between the target control input and the target observed behavior, e.g., between a target predicted acceleration ar and a target observed acceleration $$a_T^{meas},$$

for a previous time step i−1. In the first iteration of the feedback loop 400, the computer 105 may use zero for the difference.

In a block 410, the computer 105 actuates the host vehicle 100 according to the host control input $u_H$, e.g., actuates at least one component of the host vehicle 100 such as the propulsion system 120 and/or the brake system 125, as described above. The actuation results in the host kinematic state used in the next time step i+1.

In a block 415, the target vehicle 200 actuates independently of the host vehicle 100, resulting in the target observed behavior. The computer 105 does not include instructions to actuate the target vehicle 200.

In a summation block 420, the computer 105 determines the difference between the target control input and the target observed behavior for the current time step i. For example, the computer 105 determines the difference $\hat{w}_T$ between the target observed acceleration $$a_T^{meas}$$

and the target predicted acceleration ar, as described above.

In a delay block 425, the computer 105 delays the difference from the time step i to be used in the block 405 in the time step i+1, i.e., the next iteration of the feedback loop 400. The length of the delay $\Delta t$ may be the length of time of the time step i. The time steps i may correspond to computation steps, e.g., approximately 50 milliseconds.

Figure 5:
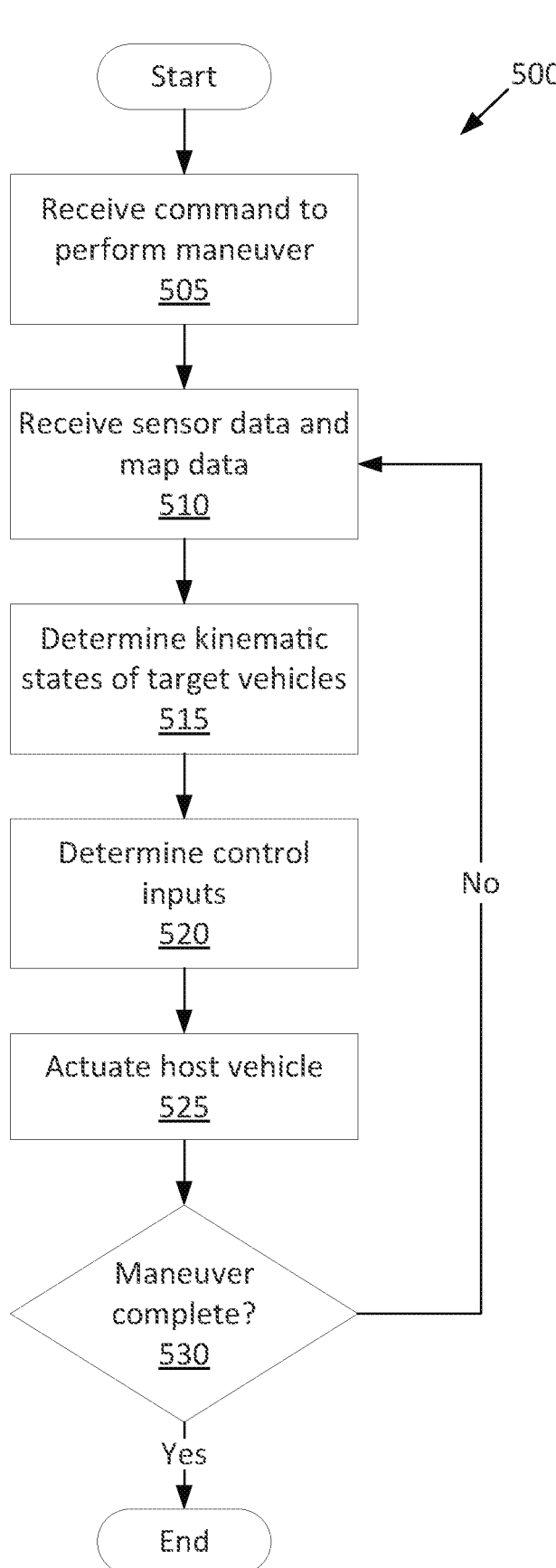
FIG. 5 is a flowchart of an example process for controlling the vehicle to perform a maneuver.

FIG. 5 is a flowchart illustrating an example process 500 for controlling the host vehicle 100 to perform the maneuver. The memory of the computer 105 stores executable instructions for performing the steps of the process 500 and/or programming can be implemented in structures such as mentioned above. As a general overview of the process 500, the computer 105 receives the command for the host vehicle 100 to perform the maneuver, receives data from the sensors 115 detecting at least one target vehicle 200, determines the host kinematic state and target kinematic state, determines the host control input and the target control input, and actuates the host vehicle 100 to perform the maneuver according to the host control input. The computer 105 repeats these steps until the maneuver is complete.

The process 500 begins in a block 505, in which the computer 105 receives the command for a host vehicle 100 to perform the maneuver, as described above.

Next, in a block 510, the computer 105 receives data from the sensors 115 and detects the target vehicles 200, as described above.

Next, in a block 515, the computer 105 determines the host kinematic state and target kinematic states, as described above.

Next, in a block 520, the computer 105 determines the host control input and the target control inputs based on the minimization of the cost function, as described above.

Next, in a block 525, the computer 105 actuates the host vehicle 100 to perform the maneuver according to the host control input. The instructions do not include instructions to actuate the target vehicle 200.

Next, in a decision block 530, the computer 105 determines whether the maneuver is complete. For example, the computer 105 may determine whether the host vehicle 100 is within a distance threshold from a center of the target lane 210. The distance may be chosen to be a typical deviation of a vehicle from a center of a lane while traveling straight in the lane. If the host vehicle 100 is farther from the center of the target lane 210 than the distance threshold, the process 500 returns to the block 505 to continue updating the host control input for controlling the host vehicle 100 to perform the maneuver. If the host vehicle 100 is closer to the center of the target lane 210 than the distance threshold, the process 500 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

receive a command for a host vehicle to perform a maneuver;

detect a target vehicle;

minimize a cost function by determining a host control input and a target control input that minimize the cost function, the host control input being one or more values that control operation of a component of the host vehicle, the target control input being one or more values that control operation of a component of the target vehicle, the cost function including a host cost and a target cost, the host cost being a cost associated with a host kinematic state of the host vehicle, the target cost being a cost associated with a target kinematic state of the target vehicle; and actuate the host vehicle to perform the maneuver according to the host control input;

wherein the target control input is not used for actuating the target vehicle.

2. The computer of claim 1, wherein the host control input includes a host acceleration of the host vehicle.

3. The computer of claim 1, wherein the instructions further include instructions to execute a feedback loop, the feedback loop including the minimization of the cost function.

4. The computer of claim 3, wherein the feedback loop includes a determination of a difference between the target control input and a target observed behavior of the target vehicle.

5. The computer of claim 4, wherein the target control input includes a target predicted acceleration of the target vehicle, and the target observed behavior includes a target observed acceleration of the target vehicle.

6. The computer of claim 1, wherein the maneuver is the host vehicle entering a lane.

7. The computer of claim 6, wherein the target vehicle is in the lane.

8. The computer of claim 6, wherein the instructions further include instructions to select between the host vehicle entering the lane in front of the target vehicle and the host vehicle entering the lane behind the target vehicle by minimizing the cost function.

9. The computer of claim 1, wherein the cost function includes a summation of the host cost through a completion of the maneuver and a summation of the target cost through the completion of the maneuver.

10. The computer of claim 1, wherein the host cost includes a host acceleration cost associated with an acceleration of the host vehicle.

11. The computer of claim 10, wherein the target cost includes a target acceleration cost associated with an acceleration of the target vehicle.

12. The computer of claim 1, wherein the host cost includes a speed cost associated with a speed of the host vehicle.

13. The computer of claim 1, wherein the host cost includes a jerk cost associated with a change in acceleration of the host vehicle.

14. The computer of claim 1, wherein the instructions to minimize the cost function include instructions to minimize the cost function subject to a constraint to prevent intersecting a virtual barrier of the target vehicle.

15. The computer of claim 1, wherein the instructions to minimize the cost function include instructions to perform mixed-integer quadratic programming.

16. The computer of claim 1, wherein the target vehicle is a first target vehicle, the target cost is a first target cost, the target kinematic state is a first target kinematic state, the instructions include instructions to detect a second target vehicle, the cost function includes a second target cost, and the second target cost is associated with a second target kinematic state of the second target vehicle.

17. The computer of claim 16, wherein the maneuver is the host vehicle entering a lane, the first target vehicle and the second target vehicle are in the lane, the first target vehicle is ahead of the second target vehicle, and the instructions further include instructions to select among (1) the host vehicle entering the lane in front of the first target vehicle, (2) the host vehicle entering the lane behind the first target vehicle and ahead of the second target vehicle, and (3) the host vehicle entering the lane behind the second target vehicle, by minimizing the cost function.

18. The computer of claim 1, wherein the minimization of the cost function by determining the host control input and the target control input is not used for controlling the target vehicle.

19. A method comprising:

receiving a command for a host vehicle to perform a maneuver;

detecting a target vehicle;

minimizing a cost function by determining a host control input and a target control input that minimize the cost function, the host control input being one or more values that control operation of a component of the host vehicle, the target control input being one or more values that control operation of a component of the target vehicle, the cost function including a host cost and a target cost, the host cost being a cost associated with a host kinematic state of the host vehicle, the target cost being a cost associated with a target kinematic state of the target vehicle; and actuating the host vehicle to perform the maneuver according to the host control input;

wherein the minimization of the cost function is not used for controlling the target vehicle.

20. The method of claim 19, wherein the minimization of the cost function by determining the host control input and the target control input is not used for controlling the target vehicle.

* * * * *